United States Patent Office 3,466,893
Patented Sept. 16, 1969

3,466,893
ABSORBER-CONDENSER APPARATUS
Benjamin A. Phillips and John Roeder, Jr., Benton Harbor, Mich., assignors to Whirlpool Corporation, a corporation of Delaware
Filed Apr. 5, 1968, Ser. No. 719,161
Int. Cl. F25b 15/00
U.S. Cl. 62—476         8 Claims

ABSTRACT OF THE DISCLOSURE

An absorption refrigeration system having a bank of a plurality of adjacent conduit coils over which cooling air is directed from one side of the bank to the other with at least two coils in the bank having portions operating as an absorber to absorb gaseous refrigerant into absorption liquid and other portions operating as a condenser for condensing gaseous refrigerant into liquid refrigerant. The conduit transfers the refrigerant and liquid from the absorber portion of one coil through the absorber portion of a second coil prior to leaving the bank and transfers refrigerant from the condenser portion of one coil through the condenser portion of a second coil prior to leaving the bank. In the preferred structure the second coil is located in the bank to be contacted first by the air stream before the air stream is warmed by contact with the other coils.

---

One of the features of this invention is to provide in an absorption refrigeration system a bank of a plurality of adjacent conduit coils over which cooling air is directed from one side of the bank to the other and in which one portion of a coil is used to contact gaseous refrigerant with absorption liquid for absorption therein and another portion of this coil operates as a condenser for condensing gaseous refrigerant to liquid refrigerant and means are provided for transferring the refrigerant and liquid from the absorber portion of the coil through the absorber portion of a second coil before leaving the bank and means are provided for transferring the refrigerant of the coil through the condenser portion of the second coil prior to leaving the bank.

Other features and advantages of the invention will be apparent from the following description of one embodiment thereof taken in conjunction with the accompanying drawings. Of the drawings.

Figure 1:
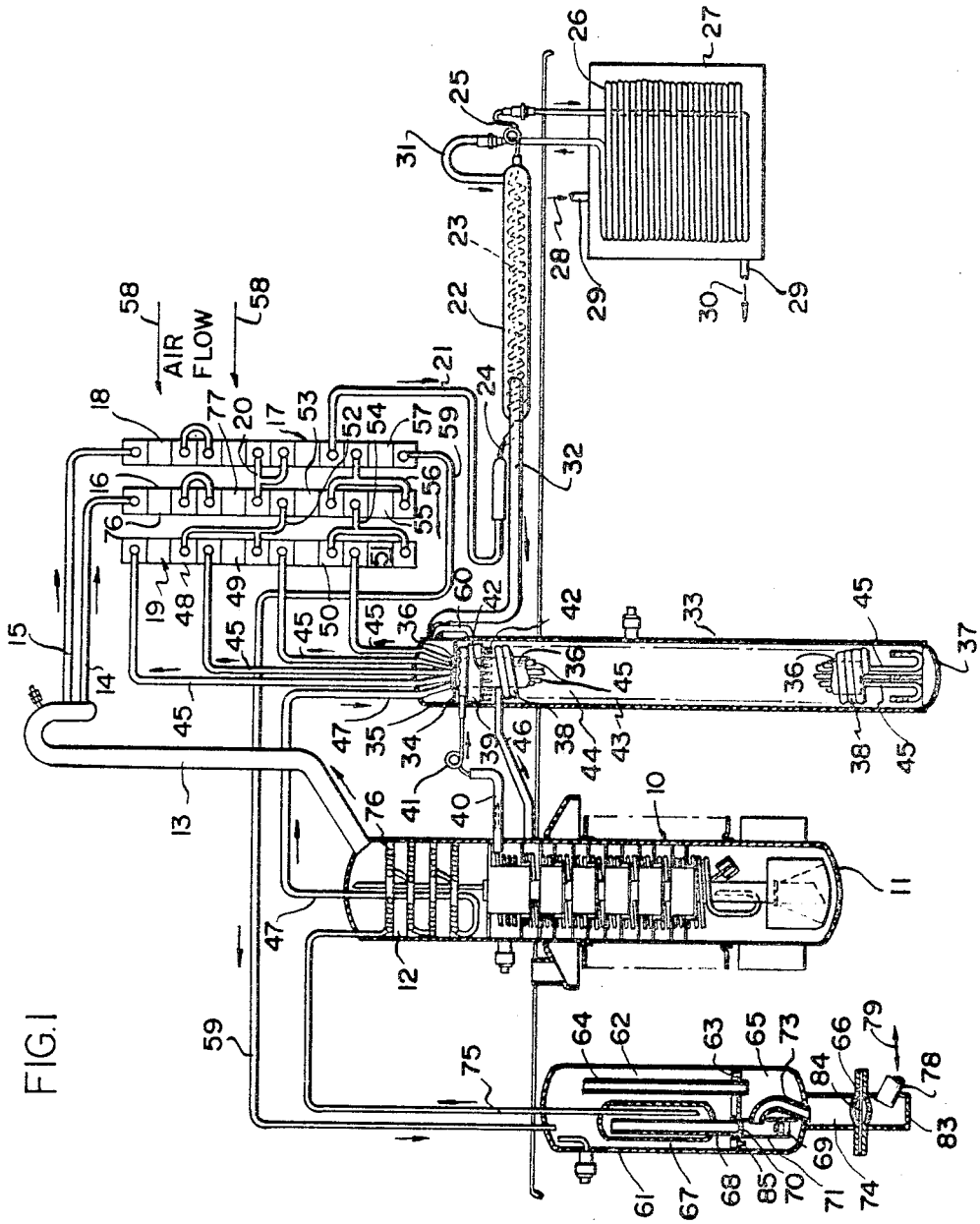
FIGURE 1 is a semi-diagrammatic representation of a liquid-gas refrigeration system having parts thereof embodying the invention and with certain parts shown in section and others in side elevation.

In the system shown in the drawings there is provided a generator-reflux condenser 10. Heat is applied to the bottom 11 of the generator in the customary manner as by a gas flame (not shown) with the result that gaseous refrigerant is driven off and collects in the top space 12 of the generator from where it is directed through a pipe 13 and from there through two smaller parallel pipes 14 and 15 with the pipe 14 leading to the entrance of a coil 16 of a bank of coils 17 arranged adjacent each other. The other and parallel pipe 15 leads to the entrance of another coil 18 in this bank. The bank 17 of coils which in the illustrated embodiment is completed by still another coil 19 operates as a combined absorber and condenser.

The absorber portion of the bank will be explained hereinafter. The condenser portion receives the gaseous refrigerant which is in heated condition from the generator space 12 by way of the large pipe 13 and two smaller pipes 14 and 15 into the closely adjacent parallel coils 16 and 18. As the gaseous refrigerant becomes reduced in volume due to its condensing to a liquid the refrigerant at a lower point in the coil 16 is conveyed to a portion of the outer coil 18 by means of a branch line 20. After condensation is complete in the coil 18 the liquid refrigerant then passes from the coil 18 by means of a pipe 21 into a heat exchanger 22. This heat exchanger is disclosed in the copending application of John Roeder, Jr., Ser. No. 498,235, filed Oct. 20, 1965, and assigned to the same assignee as the present application.

The liquid refrigerant from the pipe 21 passes through a helical coil 23 in the heat exchanger 22 by way of a short capillary tube 24 at the entrance to the helical coil 23. Upon leaving the coil 23 the liquid refrigerant then passes through another capillary tube 25 into a coil evaporator 26 surrounded by a container 27 for a heat exchange liquid. This heat exchange liquid flows into the container 27 by way of a circulatory pipe 29 as indicated by the arrow 28, is chilled therein and then flows from the container 27 by way of the pipe 29 as indicated by the arrow 30. In this embodiment the chilled liquid flowing through the pipe 29 is used to air condition a building (not shown) in the customary manner.

Gaseous refrigerant from the evaporator 26 is conducted by way of a pipe 31 to the interior of the heat exchanger 22 surrounding the helical coil 23. From the interior of the exchanger 22 the gaseous refrigerant which has precooled the entering liquid refrigerant in the coil 23 is conveyed by a pipe 32 to the top of a vertical absorber-heat exchanger 33.

In the absorber-heat exchanger 33 a bulkhead cross plate 34 defines an upper section 35 into which the gaseous refrigerant flows from the pipe 32. Extending downwardly within the absorber-heat exchanger 33 from the section 35 is a vertical tube 36. This tube which extends downwardly to adjacent the bottom 37 of the absorber-heat exchanger 33 has surrounding it a helical coil 38 for conveying absorption liquid rich in dissolved refrigerant to the generator 10.

Positioned above the topmost turn of the helical coil 38 is a distributing cup 39 for weak liquid that is received from the generator 10 through a pipe 40 and capillary 41. From the cup 39 weak liquid flows through a plurality of spaced exit nozzles 42 onto the topmost end of the helical coil 38 and over the coil down to the bottom 37 for countercurrent absorption flow with refrigerant gas rising in the space between the tube 36 and the heat exchanger 33 so that the gas is absorbed in this downflowing liquid. As indicated, the coil 38 is spaced from the wall of the absorber to provide a space 43 and is also spaced from the tube 36 to provide the space 44. In the preferred construction the spaces 43 and 44 are of substantially equal width. With this arrangement the rising refrigerant gas passes on both the inner and outer sides of the coil 38 while it is being absorbed in the liquid that is flowing down over the outer surfaces of the coil 38.

The absorption liquid and a certain amount of the gaseous refrigerant entrained therein are forced upwardly by internal pressure through the plurality of pipes 45 which have their entrance ends adjacent the bottom 37 of the vertical absorber-heat exchanger 33.

The exit pipes 45 for the upward flow of absorption liquid and some gaseous refrigerant pass upwardly through the internal tube 36 so that these pipes are in heat exchange contact with the cold refrigerant gas flowing down the tube 36. Because the pipes 45 are of metal which is a heat conducting material the absorption liquid in these pipes is precooled.

The coil 38 through which flows rich liquid on its way to the generator by way of the pipe 46 is supplied with rich liquid by a pipe 47 which also extends downwardly through the tube 36.

The plurality of pipes 45 for the absorption liquid and unabsorbed refrigerant gas, here shown as four in number, are joined to the different sections 48, 49, 50 and 51 of the first coil 19 in the bank of coils 17. In these sections there is a further absorption of refrigerant gas into the liquid. The bottoms of the two sections 48 and 49 are joined by a branched pipe 52 for flow into an absorption section 53 of the first coil 16 beneath the condenser portions 76 and 77 thereof. The absorber sections 50 and 51 of the first coil 19 are joined by a similar branched pipe 54 for flow to the top of an absorber section 55 at the bottom of the second coil 16. The bottoms of the absorber sections 53 and 55 are joined by a branch pipe 56 for flow into the bottom absorber section 57 of the third coil 18 which is the outer coil which is contacted first by the cooling air flow indicated by the arrows 58. This air flow is maintained by a motor-fan unit 90 located within the U-shaped coil bank 17 and discharging upwardly.

Figure 2:
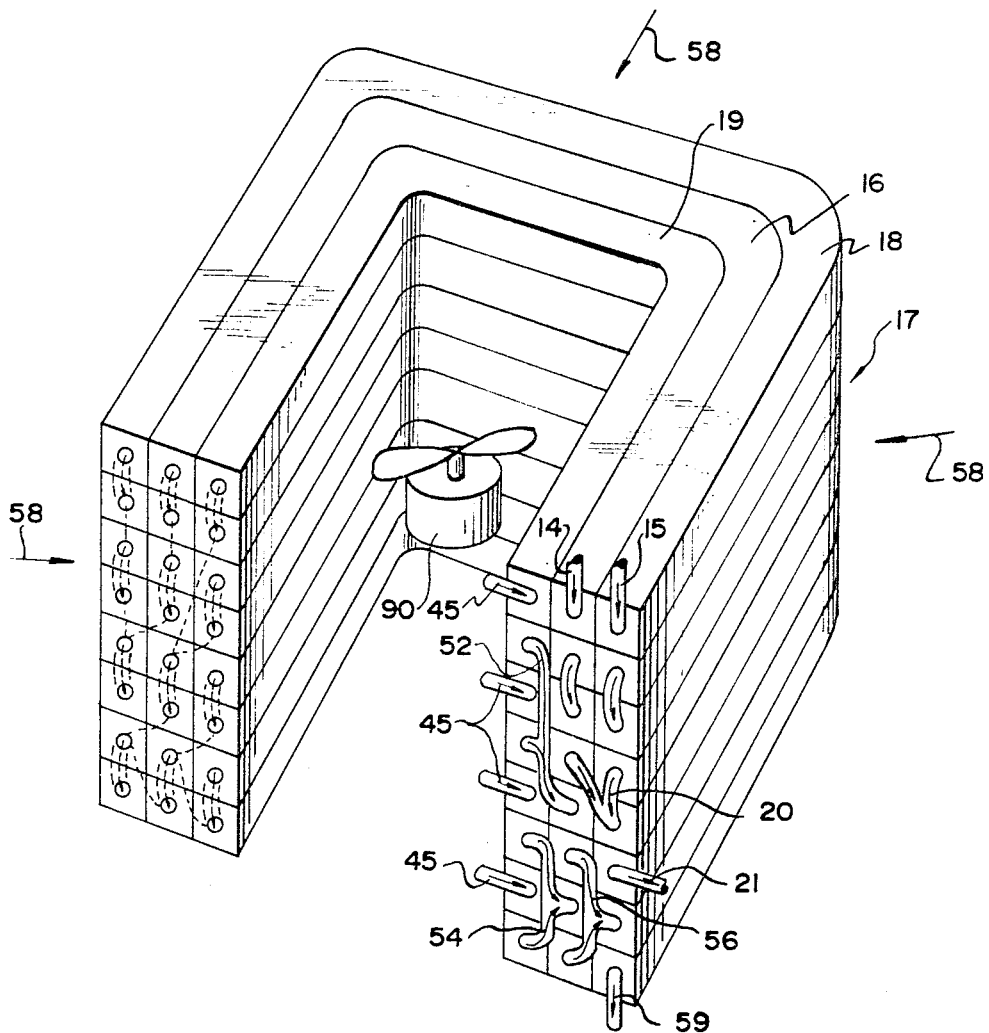
FIGURE 2 is a perspective view of a simplified showing of the bank of absorber-condenser coils of the embodiment of FIGURE 1.

As can be seen in FIGURE 2, the condenser and absorber coils are grouped in a single bank 17 of coils having a top end and a bottom end. Because the motor-fan unit 90 discharges upwardly, cooling air is drawn in from all three sides of the U-shaped bank 17 as indicated by the arrows 58. In order to provide a degree of countercurrent flow gaseous refrigerant enters at one end of bank 17 through a plurality of coils as indicated by the pipes 14 and 15 and exits at a lesser number of coils, here shown as one coil, receiving refrigerant from the branch 20 on the upstream side of the bank with respect to the cooling air flow 58. This means that the refrigerant passing through the condenser portions of the coil proceeds in a "diagonal" line in the opposite direction to the air flow.

Similarly, the refrigerant gas and absorption liquid enters the bank 17 on the opposite side or in the illustrated embodiment on the inner side and exits through a conduit 59 on the upstream or outer side of the bank so that countercurrent flow to the cooling air stream is also achieved here. Thus in the illustrated embodiment the number of coils of the condenser portions decrease in number from one end of the bank 17 (the upper end) to the other end of the bank (adjacent the lower end) to provide the countercurrent flow. The absorber portions on the other hand increase in number from this one end to the other end. The countercurrent flow to the cooling air stream in the absorber portions is provided by having the refrigerant and absorption liquid enter on the air downstream or inner side of the bank 17 and exit at the upstream or outer side.

In the bank of coils 17 there is achieved final absorption of gaseous refrigerant into the absorption liquid and condensing of gaseous refrigerant to liquid refrigerant with individual coils being arranged in finned sections with each section operating as a heat exchanger. Furthermore, in the third coil 18 where cooling by the air flow 58 is at a maximum the now liquid refrigerant is conveyed from the condenser and the rich absorption liquid is directed by way of the pipe 59 toward the generator 10.

In order to keep the absorber spaces 43 and 44 in the absorber-heat exchanger 33 free from substantial amounts of non-condensible gases which would interfere with the absorption, the top of the absorber-heat exchanger 33 beneath the top plate 34 is vented by means of a conduit 60 into the space 34. The upper exit end of this conduit is restricted and is surrounded by the gaseous refrigerant pipe 32 at its exit into the space 35 so that the flowing gaseous refrigerant sets up a vacuum in the conduit 60 to draw non-condensible gases from the top of the absorber-heat exchanger 33. By drawing these gases from the absorber 33 they cannot then interefere with the absorption of refrigerant into the liquid.

The rich absorption liquid pipe 59 empties into the top of a reservoir 61 and collects in the space 62 above a plate 63 in the reservoir 61. This liquid then overflows into the top of a vertical pipe 64 for flow to the space 65 beneath the plate 63. The rich absorption liquid from this space 65 is pumped by means of a diaphragm pump 66 into the high pressure side of the system.

This is accomplished by providing a surge tank 67 within the space 62 with a vertical pipe 68 extending upwardly through dividing plate 63 to adjacent the top of the surge tank 67. The bottom of this pipe 68 is provided with a check valve 69 which permits flow only upwardly into the pipe 68 and this pipe is also provided with a second check valve 70 above the first valve 69 that also permits flow only in an upward direction. The portion 71 of pipe 72 between these valves is connected by a short pipe 73 to the space 74 that communicates with the diaphragm pump 66.

The plate 63 which defines the bottom of the space 62 is provided with a small orifice 85 for metering rich solution from chamber 62 into the space 65. In addition to this orifice the previously described pipe 64 has its lower opening beneath the plate 63 and into the chamber 65. During operation the orifice 85 permits rich solution to pass from chamber 62 to the lower space 65 but the main flow is into the top of the pipe 64 and downwardly therethrough. During periods of shut-down the solution trapped in chamber 62 drains slowly through orifice 85 to provide sufficient liquid in the space 65 for the proper operation of the solution pump and the immediate supply of liquid to the generator 10 at start-up.

The lower ends of orifice 85 and pipe 64 are spaced below plate 63 so that the space 65 does not become completely filled with solution during these shut-down periods.

As stated earlier, the top of the vertical pipe 68 is located within the surge tank 67 adjacent the upper end thereof. Leading from adjacent the bottom of this surge tank is a rich liquid pipe 75 that leads to a coil 76 in the heated vapor space 12 at the top of the generator 10 and from there to the previously mentioned pipe 47 leading to the absorber-heat exchanger 33.

A reservoir 61-pump 66 system of this same general type is disclosed and claimed in Patent 3,357,203, issued Dec. 12, 1967, and assigned to the same assignee as the present application.

The surge tank 67 in the rich liquid pumping system traps non-condensible gases at the top of the surge tank to function as compressible means therein that aid in absorbing pressure pulsations of the diaphragm pump 66. As is customary with pumps of this type hydraulic pressure in the oil line 78 pulsates back and forth as indicated by the double-headed arrow 79, but because of the provision of the one-way valves 69 and 70 the direction of the liquid acted upon by the pump 66 is only upwardly into the surge tank 67 and from there up through the pipe 75.

The surge tank 67, therefore, has a variety of functions. It reduces water hammer effects normally set up by the pulsating pump 66, it smoothes the discharge pressure of the rich liquid through the pipe 75 to the high pressure portions of the system and collects non-condensible gases and utilizes them as a resultant cushion. In addition, the surge tank acts as a gas trap with liquid at the bottom of the tank 67 covering the inlet to the pipe 75 when the system is not operating, thereby maintaining the system substantially free from undesirable non-condensible gases.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. An absorber-condenser apparatus for an absorption refrigeration system, comprising: a bank of a plurality of adjacent conduit coils; means for directing a stream of cooling air from one side of said bank to the other, a plurality of said coils of said bank having absorber portions with an absorber entrance and an absorber exit where gaseous refrigerant is absorbed into absorption liquid and a plurality of coils of said bank having condenser portions with a condenser entrance and a condenser exit where refrigerant is condensed to a liquid; and means arranging said absorber portions and condenser portions for contact in series with said cooling air stream, the number of said absorber portion coils increasing between said absorber entrance and exit and the number of said condenser portion coils decreasing between said condenser entrance and exit.

2. The apparatus of claim 1 wherein said condenser portions are initially contacted by said air stream and then said absorber portions are contacted by said air stream.

3. The apparatus of claim 1 wherein said bank has a pair of opposite ends, the coils are arranged side-by-side, and there are provided means for directing gaseous refrigerant into a plurality of said condenser portions adjacent one end of said bank and withdrawing liquid refrigerant from a coil adjacent the opposite bank end, and means for directing gaseous refrigerant and absorption liquid into an absorber portion at said one end and withdrawing absorption liquid that is richer by having absorbed the refrigerant from said other end.

4. The apparatus of claim 3 wherein said bank has a pair of opposite sides at one of which the cooling air stream enters and the other of which the air stream leaves, said plurality of condenser portion coils being located adjacent said one side and said absorber portions are located adjacent said other side.

5. The apparatus of claim 1 wherein there are provided a first coil of said bank having a plurality of absorber portions, a second coil of said bank having a plurality of absorber portions and a plurality of condenser sections, a third coil of said bank having an absorber portion and a plurality of condenser sections, conduit means for flowing mixed gaseous refrigerant and absorption liquid through absorber portions of said first coil in parallel, then into and through absorber portions of said second coil in parallel, then into and through said third coil absorber portion where absroption is substantially complete, and condenser conduit means for flowing gaseous refrigerant through said condenser sections in said second and third coils to condense the refrigerant to a liquid.

6. The absorber-condenser of claim 5 wherein said condenser conduit means includes means for flowing said refrigerant in said second and third coils in parallel and then into and through a said condenser section in said third coil.

7. The absorber-condenser of claim 5 wherein said third coil is arranged in said bank to be contacted first by said air stream.

8. The absorber-condenser of claim 7 wherein said conduit means includes conduits between said coils in which flow is generally in a direction counter to said air stream.

References Cited

UNITED STATES PATENTS

| 2,378,177 | 6/1945 | Bichowsky | 62—485 |
| 2,387,657 | 11/1945 | Gross | 62—485 |
| 2,930,204 | 3/1960 | Lang | 62—485 |

LLOYD L. KING, Primary Examiner

U.S. Cl. X.R.

62—485